United States Patent
Hackney

(10) Patent No.: US 9,795,874 B2
(45) Date of Patent: *Oct. 24, 2017

(54) GAME CONTROLLER

(71) Applicant: CINCH GAMING EQUIPMENT LLC, Ypsilanti, MI (US)

(72) Inventor: James Hackney, Ypsilanti, MI (US)

(73) Assignee: CINCH GAMING EQUIPMENT LLC, Ypsilanti, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,141

(22) Filed: Oct. 27, 2016

(65) Prior Publication Data

US 2017/0043247 A1   Feb. 16, 2017

Related U.S. Application Data

(63) Continuation of application No. 14/327,118, filed on Jul. 9, 2014, now Pat. No. 9,504,911.

(51) Int. Cl.
*A63F 13/24*   (2014.01)

(52) U.S. Cl.
CPC .................. *A63F 13/24* (2014.09)

(58) Field of Classification Search
None
See application file for complete search history.

(56) References Cited

U.S. PATENT DOCUMENTS

| | | | |
|---|---|---|---|
| 8,480,491 B2 | 7/2013 | Burgess et al. | |
| 8,777,620 B1* | 7/2014 | Baxter | F41A 33/00 235/404 |
| 2010/0069154 A1* | 3/2010 | Claussen | A63F 13/02 463/37 |
| 2010/0298053 A1* | 11/2010 | Kotkin | A63F 13/24 463/37 |
| 2012/0142418 A1 | 6/2012 | Muramatsu | |
| 2012/0322555 A1* | 12/2012 | Burgess | A63F 13/06 463/37 |
| 2013/0267321 A1* | 10/2013 | Burgess | A63F 13/06 463/37 |
| 2014/0018173 A1* | 1/2014 | Urhman | A63F 13/24 463/37 |

* cited by examiner

*Primary Examiner* — Paul A D'Agostino
(74) *Attorney, Agent, or Firm* — Lorenz & Kopf, LLP

(57) ABSTRACT

A game controller is provided. In one embodiment, the game controller includes a main body. The game controller further includes a trigger device having a trigger body that pivots along a pivotal axis between a start point and a first stop point. The trigger body includes a top side that extends outside of the main body and a bottom side that extends within the main body. The game controller further includes a first adjustment mechanism having an adjustable contact surface that adjusts the first stop point to a second stop point by changing a point of contact below the bottom side of the trigger body.

20 Claims, 2 Drawing Sheets

GAME CONTROLLER

CROSS-REFERENCE TO RELATED APPLICATION

This application is a continuation application of U.S. application Ser. No. 14/327,118, filed Jul. 9, 2014, which is hereby incorporated in its entirety by reference.

TECHNICAL FIELD

The present disclosure generally relates to controllers for controlling the play of computerized games, and more particularly to a trigger mechanism of a game controller.

BACKGROUND

Game controllers include one or more actuator devices that are depressible by an index finger or other finger of a user. Some actuator devices may be trigger actuators, that, when depressed, generate signals indicating an amount or degree of depression. The trigger signals are sent to a game console and used to control a feature of the game.

During game play, in some instances, it is desirable to depress the trigger actuator only a certain amount. For example, when controlling the trigger mechanism of a simulated weapon such as a machine gun, it is desirable to depress the trigger to a certain position such that firing the weapon has been achieved. Once firing the weapon has been achieved, it is not desirable in some situations to depress the trigger any further even though the user may do so. In many cases depressing the trigger further does not change any in-game features and therefore only increases the time in which successive trigger pulls can be made. As can be appreciated, not all features in game play have the same desired position. It may be difficult for a user to intentionally depress the trigger to a particular position.

Accordingly, it is desirable to provide methods and systems for adjusting the trigger mechanism such that a set stop position may be achieved during game play. Furthermore, other desirable features and characteristics of the present invention will become apparent from the subsequent detailed description of the invention and the appended claims, taken in conjunction with the accompanying drawings and this background of the invention.

SUMMARY

A game controller is provided. In one embodiment, the game controller includes a main body. The game controller further includes a trigger device having a trigger body that pivots along a pivotal axis between a start point and a first stop point. The trigger body includes a top side that extends outside of the main body and a bottom side that extends within the main body. The game controller further includes a first adjustment mechanism having an adjustable contact surface that adjusts the first stop point to a second stop point by changing a point of contact below the bottom side of the trigger body.

DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
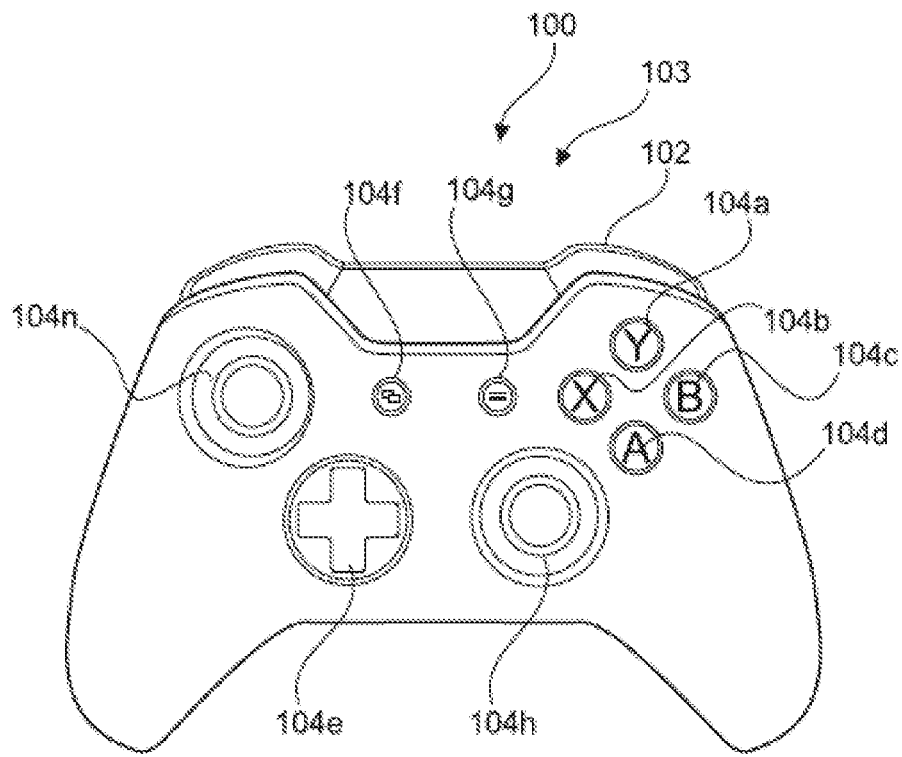
FIG. 1 is a perspective view of a front of an exemplary game controller in accordance with various embodiments.
Figure 2:
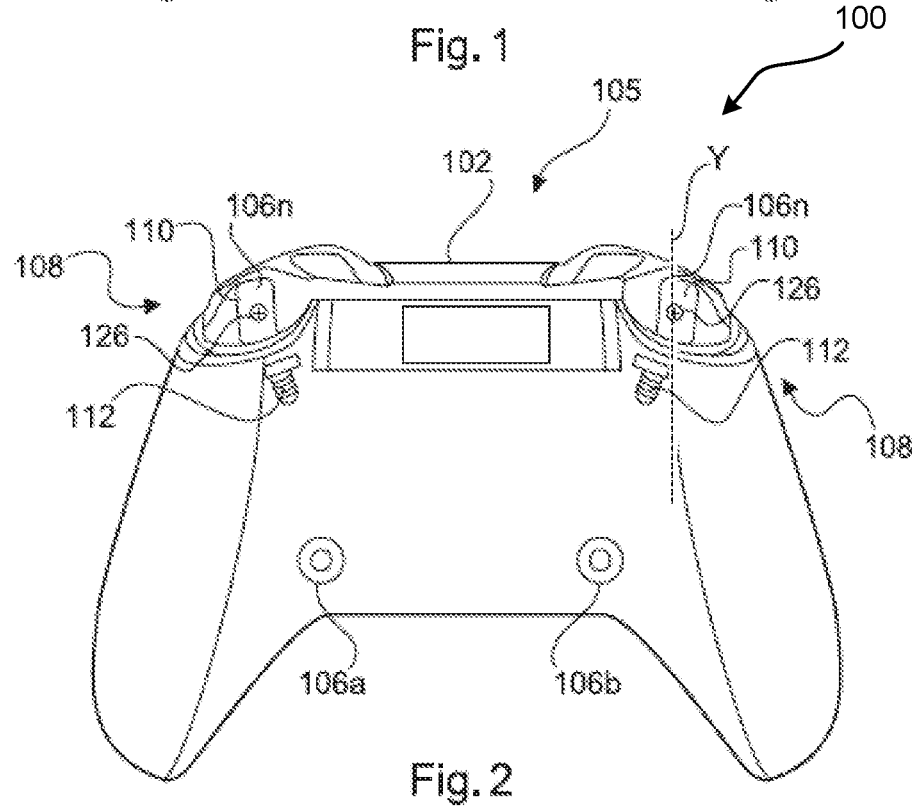
FIG. 2 is a perspective view of a back of the game controller of FIG. 1 in accordance with various embodiments.

With reference to FIGS. 1-2, a game controller 100 is shown that includes one or more trigger adjustment mechanisms in accordance with various embodiments. Although the figures shown herein depict an example with certain arrangements of elements, additional intervening elements, devices, features, or components may be present in an actual embodiments. It should also be understood FIGS. 1-2 are merely illustrative and may not be drawn to scale.

As depicted in FIGS. 1-2, the game controller 100 generally includes a main body 102 and one or more actuator devices disposed thereon. The main body 102 may be configured to be held by a player or user of a game. The actuator devices generate signals that are transmitted (e.g., wired or wirelessly) to a game console (not shown) and/or processed within the game controller 100 for game play.

In various embodiments, a front side 103 of the game controller 100 (shown in FIG. 1) includes actuator devices 104a-104n that, when depressed or manipulated by a finger or thumb of the user, generate signals that indicate the depression of the button or a direction or degree in which the button was manipulated. For example, one or more of the actuator devices 104a-104g may be digital devices (e.g., selection buttons, direction pads, etc.) that generate digital signals based on the depression of the actuator device. In another example, one or more of the actuator devices 104h-104n may be analog devices (e.g., joysticks, etc.) that generate analog signals based on manipulation of the actuator device.

A back side 105 of the game controller 100 (shown in FIG. 2) similarly includes actuator devices 106a-106n that, when depressed or manipulated by a finger or thumb of the user, generate signals that indicate the depression of the button or a direction or degree in which the button was manipulated. For example, one or more of the actuator devices 106a-106b may be digital devices (e.g., selection buttons, or other buttons) that generate digital signals based on the depression of the actuator device.

In various embodiments, at least one of the actuator devices 106a-106n on the back side 105 of the game controller 100 is a trigger device 108. The trigger device 108 includes a trigger body 110 that is depressible. The trigger device 108 may be an analog device that, when depressed generates an analog signal based on an amount or degree of the depression.

In various embodiments, the trigger device 108 includes at least one adjustment mechanism 112 in accordance with various embodiments. In one example, the adjustable adjustment mechanism 112 extends through the main body 102 at a location below the trigger body 110 and adjusts a stop position of the trigger device 108. For example, the adjustable adjustment mechanism 112 includes a surface area that contacts a surface area of the trigger body 110 when the trigger body 110 is depressed a certain amount. The contact of the two surface areas stops the trigger body 110 from further movement.

Figure 3:
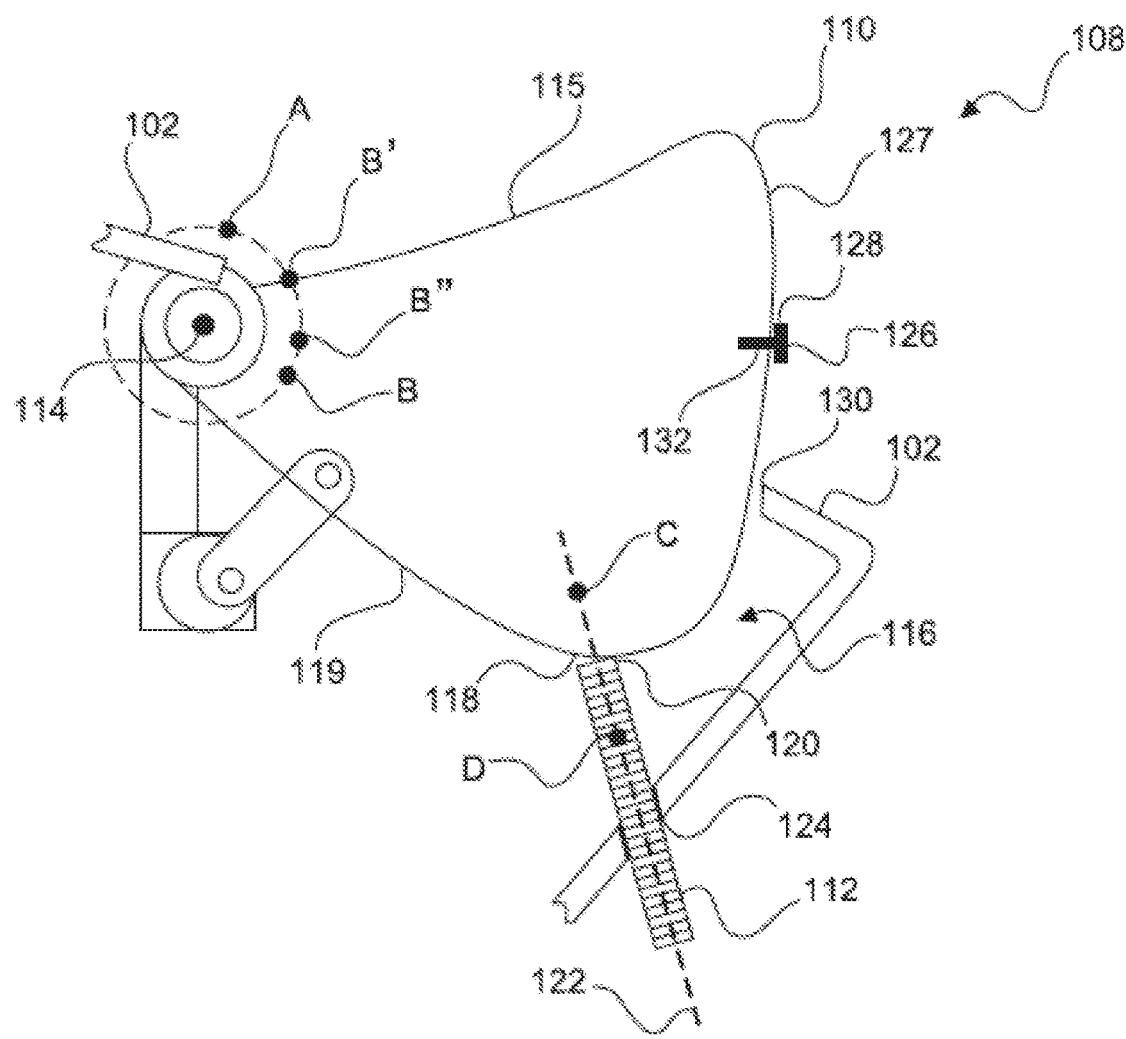
FIG. 3 is a cross-sectional view of a side of the game controller of FIGS. 1 and 2 in accordance with various embodiments.

As shown in more detail in the cross sectional side view of FIG. 3 (from the section plane Y of FIG. 2), the trigger body 110 pivots along a pivot axis 114 which may be substantially perpendicular to one of the surfaces of the main body 102. In one example, a top side 115 of the trigger body 110 pivots between point A (a start point) and point B (a stop point). The adjustable adjustment mechanism 112 is used to adjust the point B (the stop point) to B' (an adjusted stop point).

For example, at least a portion of the adjustable adjustment mechanism 112 extends through the main body 102 and into an inner cavity 116 of the main body 102. When the trigger body 110 is depressed enough (as shown), a surface area 118 of a bottom side 119 of the trigger body 110 contacts a surface area 120 at an end of the adjustable adjustment mechanism 112 to stop the trigger body 110 from further depression. The surface area 118 may extend along the entire bottom side 119 of the trigger body 110 or may include only a portion of the bottom side 119 of the trigger body 110 (e.g., a protrusion from one or more sidewalls). For example, in game controllers for the Xbox®, a protrusion associated with a set screw (not shown) may be used as the surface area 118.

Given the length of the adjustable adjustment mechanism 112 shown, the surface area 120 of the adjustable adjustment mechanism 112 (and thus, the contact position) may be adjusted to any number of positions between point C and point D along an axis 122. The axis may be substantially perpendicular to the pivot axis 114. Adjusting the contact position causes the point B on the pivot axis 114 to be adjusted to point B'. It should be noted that although the surface area 120 and surface area 118 are described and illustrated herein, the contact between the adjustment mechanism 112 and the trigger body 110 is not limited to surface contact. Rather, the adjustment mechanism 112 may contact the trigger body 110 through point to point contact, or point to surface contact. Thus, the embodiments herein are merely exemplary.

For exemplary purposes, the embodiments described and shown include a screw as the adjustable adjustment mechanism 112. The screw is received in screw threads 124 of the back side 105 (FIG. 2) of the main body 102. The screw threads 124 may be cut into the main body 102 or may be part of a thread insert (not shown) that is inserted into an opening in the main body 102. As can be appreciated, in various other embodiments, the adjustable adjustment mechanism 112 may be implemented as a plunger device, a screw or rod with a lever or arm attached, a screw or rod with any number of modifications or attachments, or any other element that is adjustable relative to the main body 102 to adjust the movement of the trigger device 108.

With reference back to FIG. 2, in addition to the adjustable adjustment mechanism 112, in various embodiments, the trigger device 108 may further include a non-adjustable adjustment mechanism 126. The non-adjustable adjustment mechanism 126 extends through a top side 127 (FIG. 3) of the trigger body 110 to provide a non-adjustable stop position of the trigger device 108. For example, the non-adjustable adjustment mechanism 126 includes a surface area that contacts a surface area of the main body 102 when the trigger body 110 is depressed a certain amount. The contact of the two surface areas stops the trigger body 110 from further movement.

As shown in more detail in the cross sectional view of FIG. 3, in various embodiments, when the trigger body 110 is depressed enough, a surface area 128 of the non-adjustable adjustment mechanism 126 that protrudes out from the trigger body 110 contacts a surface area 130 the main body 102 to stop the trigger body 110 from further depression. When the non-adjustable adjustment mechanism 126 is in place, the pivot range of the top side 115 of the trigger body 110 is between point A and point B" along the pivot axis 114. When the non-adjustable adjustment mechanism 126 is removed, the pivot range of the top side 114 of the trigger body 110 is between point A and point B or B'(depending on whether the adjustable adjustment mechanism 112 is in place).

For exemplary purposes, the embodiments described and shown implement the non-adjustable adjustment mechanism 126 as a screw that extends through a top side 127 of the trigger body 110. The screw is received in screw threads 132 of the trigger body 110. The screw threads 132 may be cut into the trigger body 110 or may be part of a thread insert (not shown) that is inserted into an opening in the trigger body 110. As can be appreciated, in various other embodiments, the non-adjustable adjustment mechanism 126 may be implemented at various locations of the trigger body 110. For example, the non-adjustable adjustment mechanism 126 may extend through a side or sides of the trigger body 110, so long as when depressed, the non-adjustment mechanism 126 contacts a surface area of the main body 102. As can further be appreciated, in various embodiments, the non-adjustable adjustment mechanism 126 may be implemented as a rod inserted into holes, a screw screwed into threads, or any other mechanism for creating a contact surface that stops the movement of the trigger body 110 relative to the main body 102.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A game controller, comprising:
a main body;
a trigger device having a trigger body that pivots along a pivotal axis between a start point and a first stop point, the trigger body having a top side that extends outside of the main body and a bottom side that extends within the main body; and
a first adjustment mechanism having an adjustable contact surface that is spaced apart from a second contact surface when the trigger devices is at the start point and that adjusts the first stop point to a second stop point by changing a point of contact between the adjustable contact surface and the second contact surface below the bottom side of the trigger body.

2. The game controller of claim 1, wherein the first adjustment mechanism extends through an opening in the main body.

3. The game controller of claim 2, wherein the first adjustment mechanism extends through an opening in a back side of the main body.

4. The game controller of claim 1, wherein the adjustable contact surface adjusts the first stop point to a second stop point within a range of stop points.

5. The game controller of claim 1, wherein the point of contact is between the adjustable contact surface of the first adjustment mechanism and the bottom side of the trigger body.

6. The game controller of claim 1, wherein the point of contact is between the adjustable contact surface of the first adjustment mechanism and a protrusion of the trigger body.

7. The game controller of claim 1, further comprising a second adjustment mechanism having a surface that contacts a surface of the main body at a second point of contact when the trigger body is depressed.

8. The game controller of claim 7, wherein the second adjustment mechanism has a contact surface that adjusts the first stop point to a third stop point.

9. A game controller, comprising:
a main body;
a trigger device having a trigger body that extends from the main body and that pivots along a pivotal axis; and
a first adjustment mechanism extending through the main body and that is adjustable to at least a first position and a second position, and
in the first position, the first adjustment mechanism adjusts a stop position of the trigger body to a first contact position that is below the trigger body when the trigger body is depressed, and
in the second position, the first adjustment mechanism adjusts the stop position of the trigger body to a second contact position that is below the trigger body when the trigger body is depressed.

10. The game controller of claim 9, wherein the first adjustment mechanism extends through an opening in the main body.

11. The game controller of claim 10, wherein the first adjustment mechanism extends through an opening in a back side of the main body.

12. The game controller of claim 9, wherein the first contact position and the second contact position are along a same axis.

13. The game controller of claim 9, wherein the first contact position and the second contact position stop the trigger body from further depression.

14. The game controller of claim 9, wherein the first contact position stops the trigger body from further depression by providing a first contact surface.

15. The game controller of claim 9, further comprising:
a mechanism that is non-adjustable and that contacts the main body to stop the trigger body when the trigger body is depressed.

16. The game controller of claim 15, wherein the mechanism extends through an opening in the trigger body.

17. The game controller of claim 16, wherein the mechanism comprises a screw, and wherein the trigger body includes threads cut into the opening for receiving the screw.

18. The game controller of claim 16, wherein the mechanism comprises a screw, and wherein the trigger body includes a thread insert in the opening for receiving the screw.

19. The game controller of claim 9, wherein the first contact position is a position where a contact surface of the first adjustment mechanism contacts the trigger body.

20. The game controller of claim 9, wherein the first contact position is a position where a contact surface of the first adjustment mechanism contacts a protrusion of the trigger body.

* * * * *